(12) United States Patent
Hernandez Covarrubias

(10) Patent No.: US 11,498,495 B2
(45) Date of Patent: Nov. 15, 2022

(54) DIRECT MOLDED ACOUSTIC INSULATORS

(71) Applicant: GM Global Technology Operations LLC, Detroit, MI (US)

(72) Inventor: Alejandro Hernandez Covarrubias, San Mateo (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 567 days.

(21) Appl. No.: 16/563,181

(22) Filed: Sep. 6, 2019

(65) Prior Publication Data
US 2021/0070235 A1    Mar. 11, 2021

(51) Int. Cl.
*B29C 33/10*    (2006.01)
*B29C 43/14*    (2006.01)
(Continued)

(52) U.S. Cl.
CPC ............. *B60R 13/08* (2013.01); *B29C 33/10* (2013.01); *B29C 43/52* (2013.01); *B29C 44/18* (2013.01); *B29C 65/1425* (2013.01); *B29C 66/69* (2013.01); *B29C 2043/144* (2013.01); *B29C 2043/3416* (2013.01); *B29K 2995/0002* (2013.01); *B32B 2307/102* (2013.01); *B32B 2310/0862* (2013.01); *B32B 2605/003* (2013.01)

(58) Field of Classification Search
CPC ... B29C 33/10; B29C 35/049; B29C 35/0805; B29C 2035/0855; B29C 43/02; B29C 43/14; B29C 43/34; B29C 43/52; B29C 2043/141; B29C 2043/144; B29C 2043/3405; B29C 2043/3416; B29C 2043/3427; B29C 44/18; B29C 65/1425; B29C 66/69; B29C 67/202; B29K 2023/12; B29K 2067/003; B29K 2105/04; B29K 2105/12; B29K 2995/0002; B29L 2031/30; B29L 2031/3011; B29L 2031/3014; B29L 2031/3041; B32B 2262/0253; B32B 2262/0276; B32B 2262/0284; B32B 2262/12; B32B 2262/14; B32B 2305/026; B32B 2307/10; B32B 2307/102; B32B 2310/0862; B32B 2605/003; B60R 13/08; B60R 13/0815; D04H 1/4291; D04H 1/435; D04H 1/43825; D04H 1/43828; D04H 1/43835; D04H 1/54; D04H 1/541; D04H 1/5412; D04H 1/5418; D04H 1/558; D06M 10/003; G10K 11/16; G10K 11/162
See application file for complete search history.

(56) References Cited

U.S. PATENT DOCUMENTS 5,344,595 A * 9/1994 Aoki ................. B27N 5/02
264/102
7,918,313 B2 * 4/2011 Gross .................. D04H 1/5418
181/294
(Continued)

*Primary Examiner* — Michael A Tolin
(74) *Attorney, Agent, or Firm* — Vivacqua Crane PLLC

(57) ABSTRACT

A method to form automobile vehicle acoustic insulators includes as stages: forming a fiber mass by mixing a low melting point polymeric fiber and a high melting point polymeric fiber in predefined volumes in a mixing device; adding a water volume to the fiber mass to create a semi-solid mass; placing the semi-solid mass in a mold; internally heating the semi-solid mass in the mold using microwave energy; and expelling a first portion of the water volume through apertures created in the mold.

10 Claims, 3 Drawing Sheets

(51) Int. Cl.
    *B29C 43/34*     (2006.01)
    *B29C 43/52*     (2006.01)
    *B29C 65/14*     (2006.01)
    *B60R 13/08*     (2006.01)
    *B29C 44/18*     (2006.01)
    *B29C 65/00*     (2006.01)

(56) References Cited

U.S. PATENT DOCUMENTS

2019/0240926 A1*   8/2019   Vorenkamp ............. B29C 70/10
2019/0376280 A1*  12/2019   Yamada ................. D21H 21/14

* cited by examiner

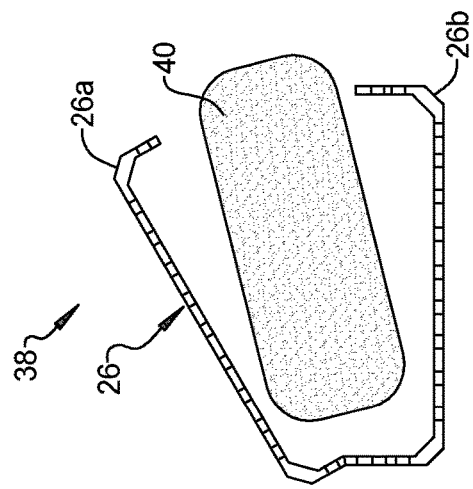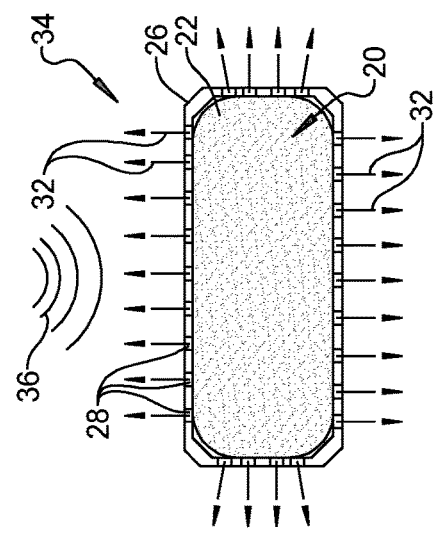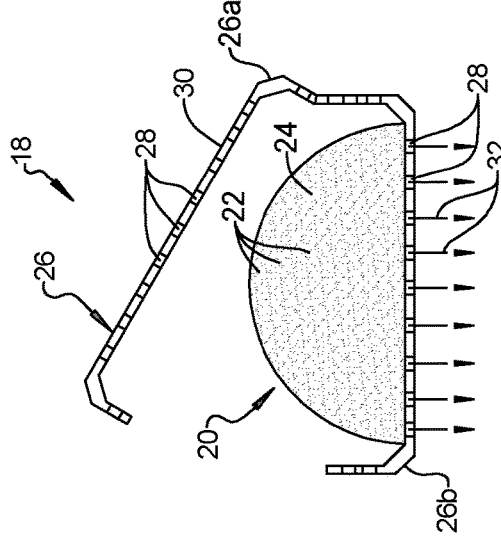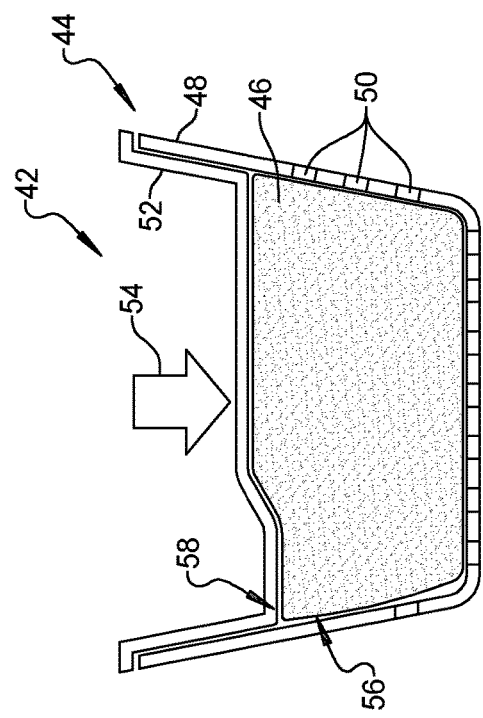

DIRECT MOLDED ACOUSTIC INSULATORS

INTRODUCTION

The present disclosure relates to acoustic insulation material used in automobile vehicles to attenuate sound such as road, engine, drivetrain and ambient noise during vehicle operation.

Acoustic insulation used in automobile vehicles is commonly made from a polymeric material such as polyurethane which provides cell gaps or cavities to attenuate sound waves. Polyurethane material can be formed into complex geometric shapes during a molding operation which lends itself to use in a wide range of vehicle acoustic insulation locations. One of the disadvantages of polyurethane material includes material degradation which occurs over time that embrittles the acoustic insulation thereby reducing its sound absorbing capability from the original level of sound absorption. A further disadvantage of polyurethane material is that compression of polyurethane material also changes the cell spacing structure, therefore compression at the time of initial installation and during vehicle use over time can also degrade the acoustic attenuation capability.

Fibrous material acoustic insulation made for example from woven or layered polyester material such as polyethylene terephthalate (PET) and polypropylene fibers are known to enhance acoustic attenuation compared to polypropylene material alone. PET and polypropylene fibrous material in a combination is difficult to mold into complex geometric shapes and is therefore commonly formed as individual layers which are limited in thickness. The layers are then combined by shaping and adhesively bonding multiple successive layers to form an acoustic insulation blanket. This process is time consuming and expensive and is limited in geometry compared to polypropylene material formed using a mold.

Thus, while current acoustic insulator materials for automobile vehicles achieve their intended purpose, there is a need for a new and improved system and method for forming acoustic insulator material that can be used in automobile vehicles.

SUMMARY

According to several aspects, a method to form automobile vehicle acoustic insulators comprises stages including: forming a fiber mass into a semi-solid mass by adding polymeric fibers and a water volume; generating energy waves to internally heat the semi-solid mass; and expelling a portion of the water volume to create a finished part defining an acoustic insulator.

In another aspect of the present disclosure, the method further includes positioning the semi-solid mass into a mold prior to the generating energy waves stage.

In another aspect of the present disclosure, the method further includes forming multiple first apertures through a mold perimeter wall of the mold to provide multiple outflow paths used during the expelling stage.

In another aspect of the present disclosure, the method further includes moving the semi-solid mass and the mold into an energy generator prior to the generating energy waves stage.

In another aspect of the present disclosure, the method further includes operating the energy generator to generate the energy waves as microwave energy.

In another aspect of the present disclosure, the method further includes: forming multiple second apertures through a first part of a shaping device to provide multiple outflow paths for expulsion of a second portion of the water volume from the semi-solid mass; and moving the semi-solid mass into the shaping device after removing the semi-solid mass from the mold.

In another aspect of the present disclosure, the forming the fiber mass stage further includes mixing the polymeric fibers including a low melting point fiber and a high melting point fiber.

In another aspect of the present disclosure, the method further includes moving the semi-solid mass using a transfer device onto a drying surface.

In another aspect of the present disclosure, the method further includes applying a heating energy to the finished part to complete removal of the water volume.

In another aspect of the present disclosure, the method further includes moving the semi-solid fiber mass into a shaping device; and creating the finished part defining the acoustic insulator by further application of a force to the shaping device to expel a second portion of the water volume.

According to several aspects, an acoustic insulator for an automobile vehicle is prepared by a process comprising the steps of: forming a fiber mass by mixing a low melting point polymeric fiber and a high melting point polymeric fiber in predefined volumes in a mixing device; internally heating the semi-solid mass in the mold using microwave energy to convert a first portion of the liquid water to gaseous water vapor; and expelling the gaseous water vapor through apertures created in the mold.

In another aspect of the present disclosure, the acoustic insulator for an automobile vehicle is prepared by the process further including applying a force to the mold to conform the semi-solid mass to an inner geometry of the mold.

In another aspect of the present disclosure, the acoustic insulator for an automobile vehicle is prepared by the process further including removing the semi-solid mass from the mold and drying the semi-solid mass to create a finished part defining an acoustic insulator.

In another aspect of the present disclosure, the acoustic insulator for an automobile vehicle is prepared by the process further including moving the semi-solid mass and the mold into an energy generator prior to the internally heating the semi-solid mass stage.

In another aspect of the present disclosure, the acoustic insulator for an automobile vehicle is prepared by the process further including forming multiple second apertures through a first part of a shaping device to provide multiple outflow paths for expulsion of a second portion of the liquid water from the semi-solid mass.

In another aspect of the present disclosure, the acoustic insulator for an automobile vehicle is prepared by the process further including moving the semi-solid mass into the shaping device after removing the fiber mass from the mold.

In another aspect of the present disclosure, the acoustic insulator for an automobile vehicle is prepared by the process further including forming the mold of a polymeric material adapted to receive the microwave energy.

According to several aspects, a system to create automobile vehicle acoustic insulators includes a fiber mass having a low melting point polymeric fiber mixed with a high melting point polymeric fiber in predefined volumes. A water volume is added to the fiber mass to create a semi-solid mass. A mold receives the semi-solid mass. A microwave energy device generates microwave energy to internally heat the semi-solid mass in the mold. Apertures created in the mold provide expulsion of a first portion of the water volume.

In another aspect of the present disclosure, a shaping device receives the semi-solid fiber mass; and a finished part is created by further application of a force to the shaping device to expel a second portion of the water volume from the semi-solid mass.

In another aspect of the present disclosure, a drying device receives the finished part to complete removal of the water volume from the semi-solid mass.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a front elevational partial cross-sectional view of an open mold containing a liquid-fiber mass during one stage of a first version of the method to form acoustic insulators of the present disclosure;

FIG. 4 is a front elevational partial cross-sectional view of the mold of FIG. 3 shown in a closed position during energy wave application;

FIG. 5 is a front elevational partial cross-sectional view of the mold of FIG. 4 shown in an open position for removal of the fiber molded part;

FIG. 6 is a front elevational partial cross-sectional view of the liquid-fiber mass positioned in a shaping mold;

DETAILED DESCRIPTION

The following description is merely exemplary in nature and is not intended to limit the present disclosure, application, or uses.

Figure 1:
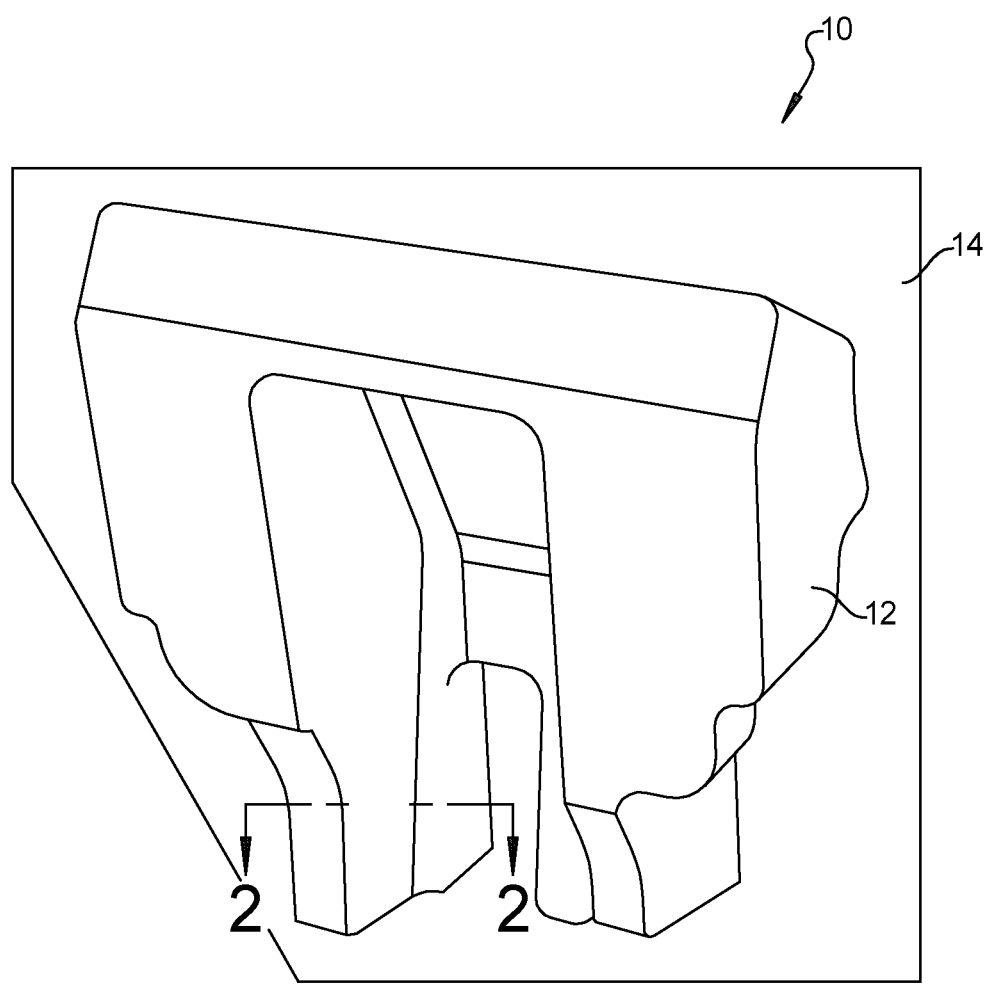
FIG. 1 is a front perspective view of a finished part produced using the method to form acoustic insulators according to an exemplary aspect.

Referring to FIG. 1, a method to form automobile vehicle acoustic insulators 10 produces a fiber bodied part 12 includes a combination of polymeric fiber materials which according to several aspects may be approximately 70% polyethylene terephthalate (PET) and approximately 30% polypropylene (PP) materials. These percentages are exemplary and can vary within the scope of the present disclosure. The fiber bodied part 12 is formed in a mold 14 therefore allowing the fiber bodied part 12 to be provided in either common or complex geometric shapes. The fiber bodied part 12 provides improved acoustic attenuation compared to similar parts made of polymeric foam materials by reducing part porosity compared to polymeric foam material, and also eliminates the necessity to form multiple layers of fiber material which are then bonded and forced into a geometric shape.

Figure 2:
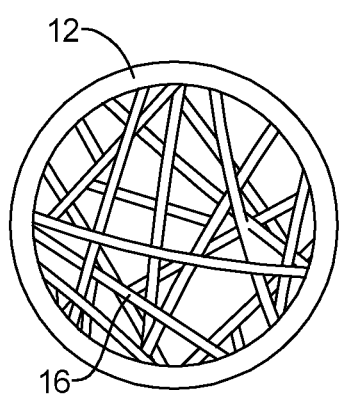
FIG. 2 is a cross sectional plan view taken at section 2 of FIG. 1.

Referring to FIG. 2 and again to FIG. 1, a fiber mesh 16 is provided within the fiber bodied part 12. Overlapping fibers of the fiber mesh 16 limit part porosity compared to parts made of polymeric foam materials and therefore reduce paths for acoustic energy to pass through the fiber bodied part 12.

Referring generally to FIGS. 3 through 6, multiple stages of a first version of the method to form automobile vehicle acoustic insulators are provided for forming the fiber bodied part 12. Referring more specifically to FIG. 3, in a first stage 18 a semi-solid fiber mass 20 is formed by adding polymeric fibers 22 and a water volume 24. The fiber mass 20 is placed in a mold 26, which according to several aspects may include a first mold half 26a and a second mold half 26b. The mold 26 includes multiple apertures 28 formed through a mold perimeter wall 30. The multiple apertures 28 provide multiple outflow paths 32 for the water volume 24 to be displaced from the mold 26.

Referring more specifically to FIG. 4, in a second stage 34 the mold 26 and the fiber mass 20 are subjected to energy waves 36, which according to several aspects define microwaves. The energy waves 36 create internal heat energy in the fiber mass 20 which boils-off at least a portion of the water volume 24. The water volume 24 principally as steam discharges through the apertures 28 and from the mold 26 via the outflow paths 32 and the heat energy generated by the addition of the energy waves 36 bonds the fibers 22.

Referring more specifically to FIG. 5, in a third stage 38 the mold 26 is opened. According to several aspects, the first mold half 26a and the second mold half 26b may be separated to open the mold 26 or rotated open for example by a mold hinge. A bonded fiber mass 40 remaining in the mold after discharge of the water volume 24 and bonding of the fibers 22 due to addition of the energy waves 36 is then removed from the mold 26.

Referring more specifically to FIG. 6 and again to FIGS. 3 through 5, in a fourth stage 42 the bonded fiber mass 40 from the third stage 38 is moved into a shaping mold 44 which reconfigures the bonded fiber mass 40 into a shape defining a finished part 46 as an acoustic insulator. The shaping mold 44 includes a mold first part 48 which includes multiple apertures 50 which are similar in function to the multiple apertures 28 described in reference to FIG. 3. A mold second part 52 is brought into contact with the mold first part 48 and a force 54 is applied to the mold second part 52. The force 54 compresses the bonded fiber mass 40 thereby pushing a remaining portion of the water volume 24 out of the bonded fiber mass 40 via the multiple apertures 50. By application of the force 54 the finished part 46 is geometrically configured by contact from a first wall configuration 56 of the mold first part 48 and a second wall configuration 58 of the mold second part 52.

Figure 7:
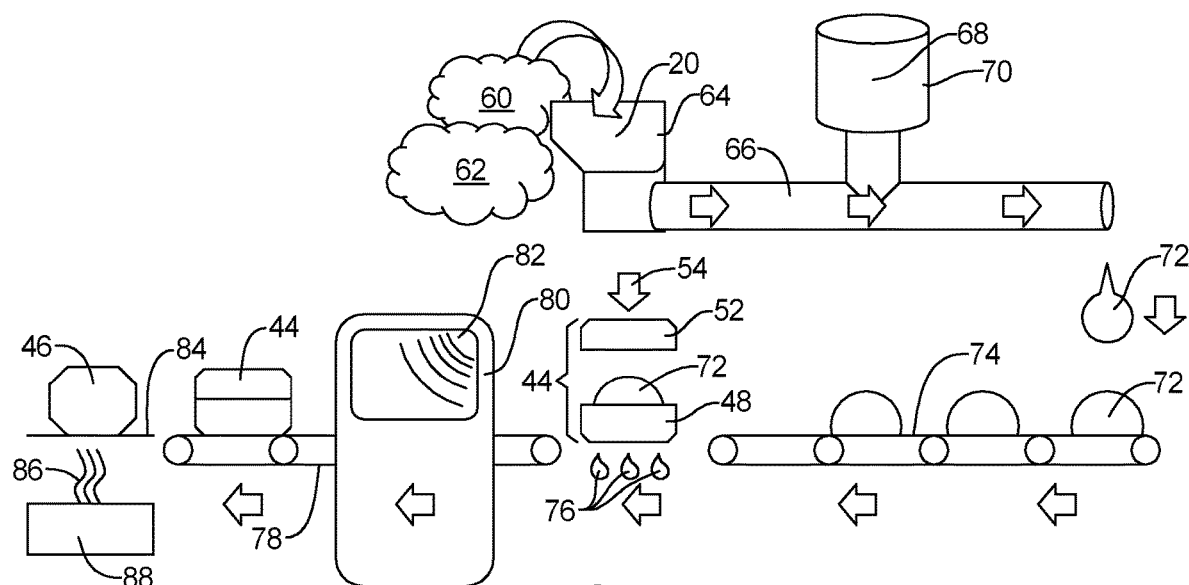
FIG. 7 is system diagram of a system for performing a second version of the method to form acoustic insulators of the present disclosure.
Figure 8:
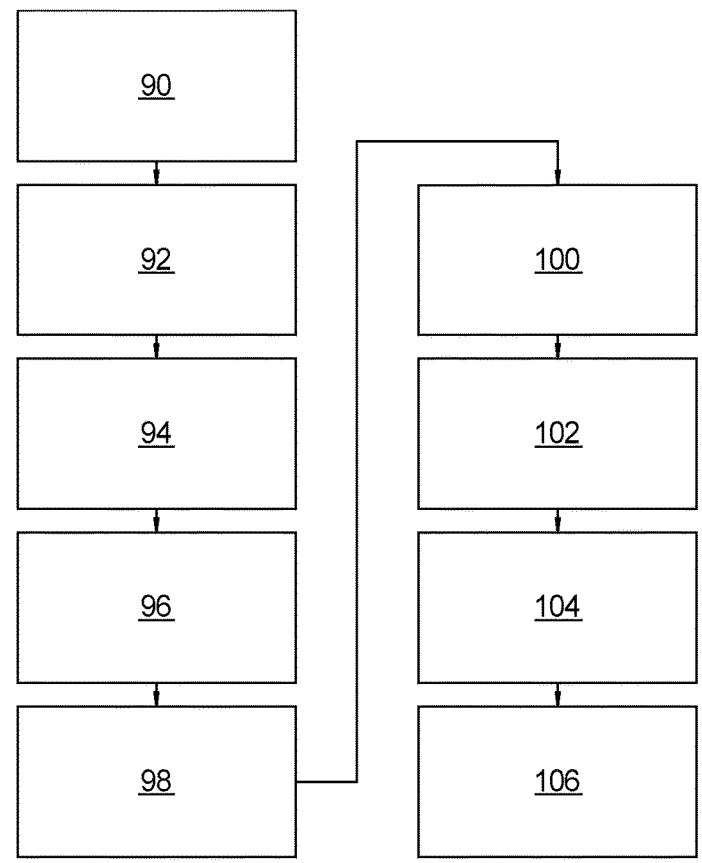
FIG. 8 is a flow diagram of the stages used for the second method to form acoustic insulators of FIG. 7.

Referring generally to FIGS. 7 and 8, multiple stages of a second version of the method to form automobile vehicle acoustic insulators are provided for forming the fiber bodied part 12. Referring specifically to FIG. 7 and again to FIGS. 1 through 6, in the second version the fiber mass 20 is created by mixing a first low melting point polymeric fiber 60 and a second high melting point polymeric fiber 62 in predefined volumes in a mixing device 64 such as a tumbler-mixer. According to several aspects, polypropylene (PP) having a melting point of approximately 130 degrees C. may be used for the first low melting point polymeric fiber 60, therefore a low melting point polymeric fiber as defined herein is a polymeric fiber having a melting point below approximately 150 degrees C. According to several aspects, polyethylene terephthalate (PET) having a melting point of approximately 260 degrees C. may be used for the second high melting point polymeric fiber 62, therefore a high melting point polymeric fiber as defined herein is a polymeric fiber having a melting point higher than the first fiber and above approximately 150 degrees C. The fiber mass 20 is moved out of the mixing device 64 into a transfer system 66 which according to several aspects may define a pneumatic-mechanical tube transfer device. A predefined volume of water 68 which can be pure or reclaimed water is discharged from a tank 70 into the transfer system 66 to mix with the fiber mass 20, thereby creating a liquid-fiber mass 72.

The liquid-fiber mass 72 is discharged onto a first transfer device 74 such as a moving belt which transfers the liquid-fiber mass 72 into a shaping mold such as the shaping mold 44 described in reference to FIG. 6. The force 54 is applied to the shaping mold 44 which drives out portions of the water 68 as water droplets 76. The shaping mold 44 is then moved onto a second transfer device 78 such as a moving belt and is transferred into an energy wave generator 80 such as an industrial microwave or dielectric heating device. Energy waves 82 are then transmitted by the energy wave generator 80 which pass into the shaping mold 44 and thereby into and heating the liquid-fiber mass 72. After a predetermined time period within the energy wave generator 80 allowing additional water 68 to exit the liquid-fiber mass 72 via internal heating and vapor or steam discharge out of the shaping mold 44, the shaping mold 44 is moved out of the energy wave generator 80 using the second transfer device 78 and opened.

The finished part 46 removed from the shaping mold 44 is moved by the second transfer device 78 onto a drying surface 84 such as an air dryer table or a heated surface. A heating energy 86 which can be provided as heated air or from a conductive heating coil using a heating device 88 is applied to the finished part 46 to remove the water 68 thereby producing the fiber bodied part 12 in a dry state.

Referring more specifically to FIG. 8 and again to FIG. 7, the multiple stages of the second version of the method to form automobile vehicle acoustic insulators are defined as follows. In a first stage 90 the fiber mass 20 is created by mixing the low melting point fiber 60 and the high melting point fiber 62. In a second stage 92 the fiber mass 20 is moved using the transfer system 66 which according to several aspects may define a pneumatic-mechanical tube transfer device. In a third stage 94 the predefined volume of the water 68 is discharged into the transfer system 66 to mix with the fiber mass 20. In a fourth stage 96 a predetermined amount of liquid water and fiber are separated depending on a predefined density desired, thereby creating the liquid-fiber mass 72 which is amorphous and therefore will take on a shape of a mold. In a fifth stage 98 the liquid-fiber mass 72 is deposited into one half of the shaping mold 44 for example through a nozzle at an end of the first transfer device 74. In a sixth stage 100 the shaping mold 44 is closed and the force 54 is applied, thereby forcing out liquid water from the liquid-fiber mass 72, the force 54 is removed and the shaping mold 44 is moved onto the second transfer device 78. In a seventh stage 102 the shaping mold 44 is moved into the energy wave generator 80. In an eighth stage 104 the liquid-fiber mass 72 is removed from the shaping mold 44. In a ninth stage 106 the liquid-fiber mass 72 is moved onto the surface 84 where the heating energy 86 is applied to complete the removal of the liquid water from the liquid-fiber mass 72 thereby producing the finished part 46 defining an acoustic insulator.

According to several aspects the mold 26 and the shaping mold 44 are made of a polymeric material which allows use in a microwave environment such as in the energy wave generator 80. The polymeric material selected for the mold 26 and the shaping mold 44 also provides for removal of the fiber mass 20, the bonded fiber mass 40 or the finished part 46.

A method to form automobile vehicle acoustic insulators of the present disclosure offers several advantages. These include deposition of fiber materials giving shape to an acoustic insulator which avoids zones where compression collapses the fibers thereby reducing acoustic performance. Chemical reactions and adhesive bonding processes are eliminated using the present method. Microwave heating also allows targeted timing of energy absorption by the fiber materials and produces insulators that have reduced degradation and increased acoustic performance compared to polyurethane parts now in use.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of forming an automobile vehicle acoustic insulator, comprising:
    forming a fiber mass into a semi-solid mass by adding polymeric fibers and a water volume;
    generating energy waves to internally heat the semi-solid mass;
    expelling a portion of the water volume to create a finished part defining an acoustic insulator;
    moving the semi-solid mass using a transfer device onto a drying surface; and
    applying a heating energy to the finished part to complete removal of the water volume.

2. The method of forming an automobile vehicle acoustic insulator of claim 1, further including positioning the semi-solid mass into a mold prior to generating the energy waves.

3. The method of forming an automobile vehicle acoustic insulator of claim 2, further including moving the semi-solid mass and the mold into an energy generator prior to generating the energy waves.

4. The method of forming an automobile vehicle acoustic insulator of claim 3, further including operating the energy generator to generate the energy waves as microwave energy.

5. The method of forming an automobile vehicle acoustic insulator of claim 2, further including forming multiple first apertures through a mold perimeter wall of the mold to provide multiple outflow paths used during the expelling step.

6. The method of forming an automobile vehicle acoustic insulator of claim 5, further including:
    providing a shaping device having a first mold part and a second mold part;
    forming multiple second apertures through the first mold part of the shaping device to provide multiple outflow paths for expulsion of a second portion of the water volume from the semi-solid mass; and
    moving the semi-solid mass into the shaping device.

7. The method of forming an automobile vehicle acoustic insulator of claim 1, wherein the polymeric fibers comprise a first fiber and a second fiber, the first fiber has a first melting point, the second fiber has a second melting point, the second melting point is higher than the first melting point, and forming the fiber mass further includes mixing the polymeric fibers including the first fiber having the first melting point and the second fiber having the second melting point higher than the first melting point.

8. The method of forming an automobile vehicle acoustic insulator of claim 1, further including:

moving the semi-solid mass into a shaping device; and creating the finished part defining the acoustic insulator by further application of a force to the shaping device to expel a second portion of the water volume.

9. The method of forming an automobile vehicle acoustic insulator of claim 1, wherein forming the fiber mass includes mixing a low melting point polymeric fiber having a melting point below approximately 150 degrees C. and a high melting point polymeric fiber having a melting point above approximately 150 degrees C. in predefined volumes in a mixing device.

10. A method of forming an automobile vehicle acoustic insulator, comprising:

forming a fiber mass into a semi-solid mass by adding polymeric fibers and a water volume;

generating energy waves to internally heat the semi-solid mass;

expelling a portion of the water volume to create a finished part defining an acoustic insulator;

positioning the semi-solid mass into a mold prior to generating the energy waves;

forming multiple first apertures through a mold perimeter wall of the mold to provide multiple outflow paths used during the expelling step; and applying a force to the mold to conform the semi-solid mass to an inner geometry of the mold and expelling a first amount of water from the mold through the multiple first apertures.

\* \* \* \* \*